Jan. 11, 1927. 1,614,106
C. A. CRIQUI ET AL
AIR CONTROLLER FOR GAS ENGINE CARBURETORS
Filed Jan. 30, 1924
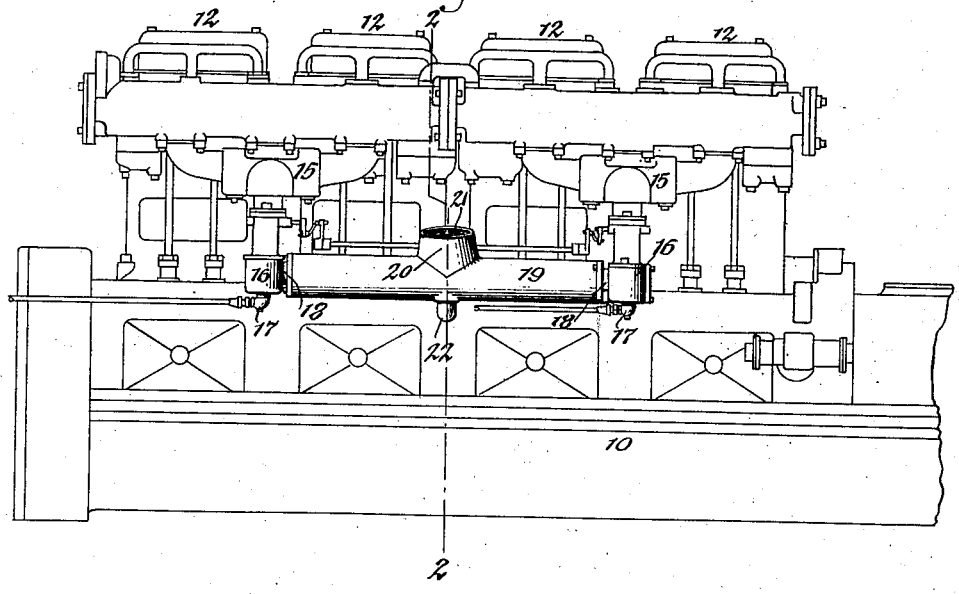
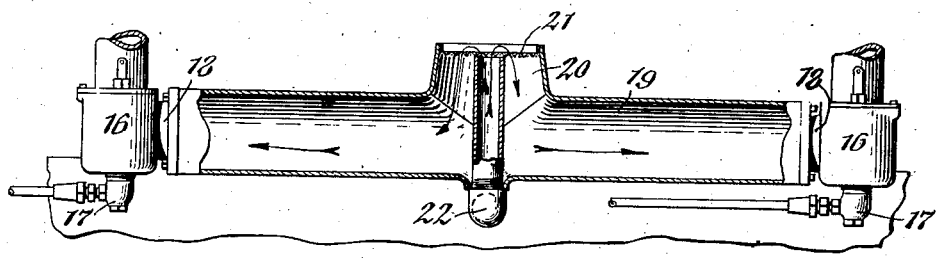
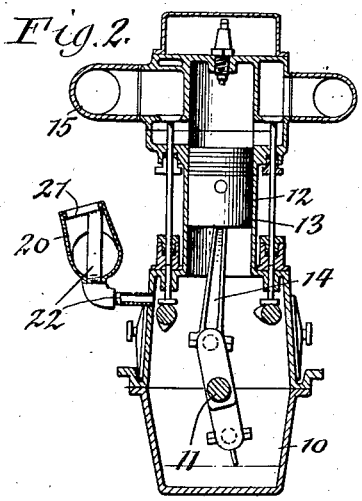
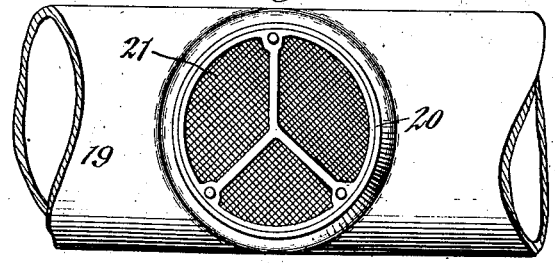
Charles A. Criqui
Elwood T. Larkin } Inventors
by Pope & Powers
Attorneys Patented Jan. 11, 1927.

1,614,106

UNITED STATES PATENT OFFICE.

CHARLES A. CRIQUI AND ELWOOD T. LARKIN, OF BUFFALO, NEW YORK; SAID LARKIN ASSIGNOR TO SAID CRIQUI.

AIR CONTROLLER FOR GAS-ENGINE CARBURETORS.

Application filed January 30, 1924. Serial No. 689,529.

This invention relates to means for supplying air to the carburetors of gas engines and more particularly to engines of this character having a multiplicity of cylinders. Carburetors as ordinarily constructed have a simple air intake through which the flame in the case of a back-fire can come out into the engine room or compartment. If the air surrounding the engine contains any highly combustible gas or should any fluid fuel be on any part of the engine where the flame strikes, an explosion or fire might result due to ignition of such air or scattered fuel by the flame of the backfire through the carburetor.

In the operation of a gas engine gaseous fuel is likely to be present in the crank case which is objectionable on account of its deteriorating effect on the lubricant of the crank pins and bearings and also on account of the liability of leakage to the exterior and explosion of the same in the hold of the boat or other place where the engine is installed.

It is the purpose of this invention to provide means for supplying one or more carburetors of a gas engine with air both from the atmosphere and from the crank case of the engine in such manner that the hazard of an explosion or setting afire outside of the engine in case of a back-fire in one or another of the carburetors is practically prevented, thus insuring greater safety and reducing the risk of accidents to a minimum.

In the accompanying drawings:

Figure 1 is a side elevation of a multiple cylinder gas engine equipped with our improvements. Figure 2 is a vertical transverse section of the same on line 2—2, Fig. 1. Figure 3 is a fragmentary vertical longitudinal section of the air supply pipe, crank case, vent pipe, carburetors and adjacent parts, on an enlarged scale, compared with Figures 1 and 2. Figure 4 is a fragmentary top plan view of the air inlet portion of the apparatus.

Similar characters of reference indicate like parts throughout the several figures.

This invention is applicable to engines of various types and constructions and that shown in the drawings, as an example, consists of an engine having a crank case 10, a crank shaft 11 journaled in the case, a plurality of power cylinders 12 mounted on the case, pistons 13 reciprocating in the cylinders and connecting rods 14 connecting the several pistons with the pins or wrists on the crank shaft.

In the present case two intake manifolds 15 are employed, each of which supplies four power cylinders with fuel and each of these manifolds is connected with the mixture outlet of a carburetor 16 which may be of any suitable or approved construction and provided with a fuel supply 17 and an air inlet 18. The air inlets of the two carburetors in the present instance are horizontally in line and face each other.

Connecting these two air inlets of the carburetors is a main section 19 of an air supply pipe or conduit which is arranged horizontally and communicates at the air outlets at its opposite ends with the air inlets of the respective carburetors which main air pipe section and the inlets of said carburetors are arranged on a straight line.

About midway of its length the main section of the air supply pipe is provided with an inlet air pipe section 20 which preferably projects upwardly and is provdied in its upper part with a screen 21 which extends entirely across the inlet end of the section so as to strain the incoming air and also prevent the passage of any flames outwardly through the same.

During the ordinary operation of the engine the inlet section of the air supply pipe serves as a common air intake for the several carburetors of the multiple cylinder engine and after each suction effect on a carburetor the respective intake valve closes to prevent back-firing during the subsequent ignition of the fuel charge. If however an intake valve should stick in its guide and be held open during a power stroke of a piston the flame of the exploding gaseous charge would back up through the intake manifold and explode the gas therein, which explosion would follow back through the respective carburetor and beyond the air inlet thereof. Ordinarily this backfire would be liable to reach the exterior and set fire to surrounding objects. Inasmuch however as any object or fluid in motion tends to continue its motion in a straight line, the explosive force of a backfire, in the present case, which leaves the air inlet of one carburetor will enter one end of the interconnecting main section of the air supply pipe and pass in a straight line through the same to the air inlet of the other carburetor because the stream of burning gas cannot make the sharp turn which would be necessary in order to pass from the main section of the air pipe into the inlet section of the same to the atmosphere. As the last mentioned carburetor is connected with a power cylinder the piston of which for the time being is effecting a suction stroke any backfire from one carburetor will be absorbed in the stream of air going into another carburetor and if any flame is projected into the air supply pipe it is readily picked up and smothered by the last mentioned carburetor.

It rarely happens that both carburetors would backfire. This might result from running out of fuel in which case some of the flame might back up through the inlet section of the air supply to the exterior but even in such a case the flame would be directed to a point that would be free from raw fluid and consequently the flame could not ignite anything lying about the engine. The air intake or supply pipe is of such shape and size that the flame and the effect of an explosion would largely die out in the air passage before it could reach the atmosphere outside of this pipe. As a consequence this organization has proven itself very efficient in eliminating fire hazard.

It has been found desirable to interconnect the crank case with the air stream flowing into the carburetors so that the crank case vapors and gases are carried from the same and into the power cylinders and consumed instead of escaping to the engine room or compartment where the gas and smoke are objectionable. To accomplish this a vent pipe or conduit 22 is employed, the inlet end of which connects with the crank case so as to communicate with the interior thereof while its outlet end extends from the underside of the horizontal main air pipe section upwardly through the upright inlet section of this air pipe and terminates at its upper end adjacent to the underside of the screen 21 and flush or substantially so, with the inlet end of the inlet section of the air supply pipe, as shown in Figures 2 and 3. By connecting up the crank case and the air supply pipe in this manner the flow of vapors or gases taken from the crank case must make a 180 degree bend or turn in order to join the main stream of air in passing from the outlet of the vent pipe 22 into the inlet branch of the air supply pipe, thereby preventing any explosive backfire in the air supply pipe from being carried back into the crank case. Any reversal in the air flow at the mouth of the air intake connections produces an ejector effect on the crank case connection, instead of a backfire pressure, which further aids in preventing ignition of any gases in the crank case. Moreover the termination of the fresh air intake and the vent pipe on the same plane and the screen extending over both these passages avoids direct and unobstructed communication between the crank case and the air intake, so that all the benefits of removing the crank case vapors are retained without contending with any disadvantages that might result if the flames were permitted to enter the crank case and possibly cause an explosion therein.

In addition to eliminating the fire hazard as above described, this invention has a further advantage in that the air intake column at the head of the carburetor has proven beneficial when a number of carburetors are used in an engine, for instance one for each cylinder. In such an arrangement the inertia force of the air column is beneficial between impulses. At this time the pressure at the engine end of the air column builds up, and particularly in high speed engines where such a multiplicity of carburetors might be used, the connection, unless properly proportioned, might result in an air column that would not stop its motion by reason of the rapid sequence of suction impulses. In other words the intervals of time between impulses would not be long enough to permit a stoppage of the flow throughout the entire length of the air pipe, but only at the engine end of the same where the pressure would build up. When the valve next opens a satisfactory flow of air would be obtained into the engine.

We claim as our invention:

1. A gas engine having a crank case, a carburetor having an air inlet, an air supply pipe provided with a main section having an outlet communicating with the inlet of said carburetor and an inlet section which is arranged at an angle to said main section and is provided with an air inlet communicating with the atmosphere, a vent pipe having an inlet end which communicates with the interior of said casing and an outlet end arranged within said air inlet section and terminating flush with the extremity of the latter, and a screen extending across the ends of said air inlet section and said vent pipe outlet.

2. A gas engine having a crank case, a plurality of carburetors each of which has an air inlet, an air supply pipe having a main section provided with a plurality of outlets communicating with the air inlets of the several carburetors and an inlet section having an inlet which communicates with the atmosphere, said main section of the air supply pipe being arranged on a straight line and the inlet section thereof at right angles thereto, and a vent pipe having an inlet part communicating with the interior of said casing and an outlet part arranged within the inlet section of said air pipe and terminating flush therewith.

3. A gas engine having a crank case, a plurality of carburetors each of which has an air inlet, an air supply pipe having a main section provided with a plurality of outlets communicating with the air inlets of the several carburetors and an inlet section having an inlet which communicates with the atmosphere, said main section of the air supply pipe being arranged on a straight line and the inlet section thereof at right angles thereto, a vent pipe having an inlet part communicating with the interior of said casing and an outlet part arranged with the inlet section of said air pipe and terminating flush therewith, and a screen extending across the inlet of said air pipe and the outlet of said vent pipe.

In testimony whereof we affix our signatures.

CHARLES A. CRIQUI.
ELWOOD T. LARKIN.